United States Patent Office 3,488,316
Patented Jan. 6, 1970

3,488,316
THERMOSETTING ORGANOMETALLIC POLYMERS OF ACRYLONITRILE
William Flavell and Geoffrey Leonard Redfearn, Chessington, England, assignors to International Copper Research Association, Inc., New York, N.Y., a corporation of New York
No Drawing. Continuation-in-part of application Ser. No. 490,734, Sept. 27, 1965. This application June 1, 1967, Ser. No. 642,689
Int. Cl. C08f 27/04
U.S. Cl. 260—32.6
22 Claims

ABSTRACT OF THE DISCLOSURE

A thermosetting organometallic polymer is prepared by reacting an acrylonitrile polymer with a copper or zinc salt, e.g., copper acetate, at an elevated temperature below about 250° C. The amount of salt and polymer used is equivalent to a CN to Cu ratio (CN/Cu) of between 1 and 8. The reaction can be carried out in a common solvent for the salt and the polymer, or it can be carried out by heating a powder mixture of the salt and the polymer under pressure.

The thermosetting organometallic polymers of this invention can be used to produce coating compositions and molding compositions in which fillers such as fiber glass, asbestos fibers and copper powders are added.

CROSS-REFERENCE TO RELATED APPLICATION

This application is a continuation-in-part application of the U.S. patent application, Ser. No. 490,734, filed on Sept. 27, 1965, and now abandoned.

BACKGROUND OF THE INVENTION

Field of the invention

This invention relates to organometallic polymeric compositions and, more particularly, to thermosetting chelating polymers containing copper and zinc. The invention also relates to a process for preparing the same and their applications as molding and coating compositions.

Description of the Prior Art

Many attempts to prepare thermally stable organometallic polymers by combining organic polymers and metallic derivatives have been reported in the literature. The prior attempts include, for example, the preparation of coordinate polymers in which the polymeric chains are formed by means of coordinate bonds between metal atoms and reactive groups of suitable organic compounds. The organometallic polymers of the prior art generally have low molecular weights and are not suitable for applications that require good mechanical properties. They are also intractable for fabrication into shaped articles of practical use using conventional techniques.

SUMMARY OF THE INVENTION

We have found that an organometallic polymer of high thermal stability, good mechanical properties and adaptable for various applications, can be prepared by heating at an elevated temperature below about 250° C. a composition comprising an acrylonitrile polymer and a metal salt capable of complexing with said polymers. The metal salt is a copper or a zinc salt and the amount of the salt and the polymer used is equivalent to about 1 mole of copper or zinc to about 1 to 8 moles of nitrile groups of the polymer. The resultant thermoset material comprises copper or zinc chemically bonded to the acrylonitrile polymer. Depending on the initial molecular weight of the acrylonitrile polymer, the molecular weight of the thermoset material of this invention hence its mechanical properties may vary within a wide range.

The composition suitable for preparing the organometallic polymer of this invention may be in the form of a dry mixture of polymers in fine powder form and metallic salt or it may be in the form of a solution which is prepared by dissolving the salt and the polymer in a common solvent. The dry mixture is used advantageously as a molding composition, in which one or more fillers may be added as reinforcement. The molded articles have applications in areas requiring good mechanical properties and high thermal stability such as those required for bearings. The composition in the form of a polymeric solution can be used as a coating composition, which is particularly suitable as an adhesive for laminating metallic sheets or as a protective coating for metallic surfaces.

The acrylonitrile polymer solution containing copper or zinc can also be used to prepare molded articles. In such an application the molding solution which preferably contains a suitable filler such as asbestos fibers and is in the form of a slurry, is treated to remove substantially all the solvent. The resultant fibrous cake is then broken up and is molded at an elevated temperature and at an elevated pressure. The molding temperature can be as high as 250° C. and in some instances, higher. Alternatively, the molding solution with fillers is moderately heated to cause partial reaction of the metal salt and polyacrylonitrile thereby forming a gel. After the removal of the solvent the gel is broken up and is used to mold into the desired shape under pressure and at an elevated temperature below about 250° C.

BRIEF DESCRIPTION OF THE PREFERRED EMBODIMENTS

The molecular weight of the acrylonitrile polymer suitable for the invention varies within a wide range depending on the end use of the final product. In general we found polymers with a molecular weight in the range of 7000–150,000 to be particularly suitable to form the organometallic polymers of this invention. The lower molecular weight polyacrylonitrile preferably is used for preparing coating compositions and adhesives and the higher molecular weight polymers for molded articles that require good mechanical properties.

A number of copper and zinc salts can be used to react with polyacrylonitrile to form the organometallic polymer of this invention. These salts may be selected from a large group of compounds prepared by the reaction of copper and zinc bases with organic and inorganic acids. Among them we found copper borate, copper acetate, copper acetylacetonate, zinc borate, and zinc acetate to be eminently suitable. Other salts that may be used include copper oxalate, copper benzoate, copper carbonate, copper phosphate, copper silicate, copper sulfate, copper chloride, copper nitrate, zinc acetylacetonate, zinc oxalate, zinc borate, zinc carbonate, zinc phosphate, zinc silicate, zinc sulfate, zinc chloride, and zinc nitrate.

The amount of metal salt that can be used to react with polyacrylonitrile varies within a wide range and is dependent upon a number of variables such as conditions of the cure, reactivities of the metal salts, and whether the reaction is carried out in a solid state or in a solvent medium. In both the dry powder and solvent medium reactions, a ratio of CN to metal (e.g., CN/Cu and CN/Zn) in the range between 1 and 8 produces organometallic polymers having higher thermal stability than the original acrylonitrile. Excellent results were obtained using a ratio of 2 to 4 with certain copper and zinc salts such as copper borate and zinc borate.

In preparing molded articles using the dry powder reaction according to the invention, the molding composition is prepared preferably by mixing an acrylonitrile polymer in a finely divided form, with a salt of copper or zinc also in a finely divided form. A suitable amount of a reinforcing fiber such as asbestos fiber or glass fiber is incorporated in the mixture, if desired, either simultaneously or subsequently. The resulting mixture is then molded into the desired shape by the application of heat and pressure at a temperautre below about 250° C. The resultant product is a thermoset product with excellent thermal stabilities at high temperatures up to 250° C.

The dry powder reaction is sensitive to molding at too high a temperature. We found when molding at a temperature substantially above about 250° C. the reaction between copper salt and polymer is strongly exothermic and may reach violent proportions. At lower molding temperatures i.e., below about 250° C., the reaction is controllable and the product may be cured to a thermoset stage in a short molding cycle. Additional heating of the molded article without the application of pressure may be needed to complete the reaction.

As stated hereinabove, molded articles can also be prepared by wet process using a molding solution containing polyacrylonitrile and a copper or zinc salt. In the wet process the acrylonitrile polymer preferably is dissolved in a solvent such as dimethyl formamide to form a polymeric solution. Suitable amounts of copper or zinc salt is then added thereto to form a molding solution. The molding solution may then be used to impregnate reinforcing fillers to form an impregnated cake. After the removal of the solvent the impregnated cake is used to mold into the desired shape at temperatures below about 250° C. Alternatively, reinforcement fibers are added to the solution to form a slurry which is then heated to the refluxing condition and until gelation occurs. The gel is then broken up and the solvent removed by evaporation. The solvent-free product is molded to the desired shape by the application of heat and pressure and, after molding, the product may be further heated without the application of pressure in order to advance the chemical reaction to the desired degree.

It is understood, that other fillers, such as copper and alumina powder can be used in place of reinforcing fibers for preparing molded articles. The selection of fillers is based on the application of the final product. For example, copper filled thermoset organo-copper polymer is particularly suitable as bearing material because of its high thermal stability, heat conductivity and excellent mechanical properties.

The solution containing dissolved polyacrylonitrile and copper or zinc salts can be used as a coating solution or adhesive. In such applications, the viscosity of the solution is adjusted to provide optimum results in terms of coatability, flexibility of the resultant coat and maximum adhesion. We found a low molecular weight acrylonitrile polymer and a high CN to metal ratio to be suitable in formulating the protective coating solutions and adhesives.

Further to illustrate this invention specific examples are described hereinbelow:

EXAMPLE I

Preparation of copper polyacrylonitrile chelating polymer

Copper acetylacetonate and polyacrylonitrile (mol. wt. 56,000), were refluxed in dimethyl-formamide (DMF) solution with constant stirring to yield an organo-copper polymer.

Copper acetyl acetonate, 2.61 gm.  
Polyacrylonitrile, 2.12 gm.  
Dimethylformamide, 150 mls.  
$\frac{CN}{Cu}$ ratio $= \frac{4}{1}$ The reactants in DMF were rapidly heated with stirring to the reflux temperature (about 157° C.) yielding a clear blue-green solution; after darkening over a period of one half hour, the reactants formed a heavy gel which was heated and stirred further, causing the gel to break up.

After a total time at reflux of 2 hours, the reaction products were filtered hot to yield a dark, almost black, product which after drying in vacuo was successively extracted with ether, chloroform and DMF to remove unreacted copper salt and PAN. The yields on extraction are shown below in schematic form.

|  | Gm. |
|---|---|
| Dried solid product | 3.65 |
| Product after ether and chloroform extraction | 2.83 |
| Product after further extraction with DMF | 2.59 |

Analysis of the final extracted product, a black granular mass, showed it to contain 8.3% copper.

A similar experiment was conducted in which the reactants were:

Copper acetyl acetonate, 2.61 gms.  
Polyacrylonitrile, 4.24 gms.  
DMF (solvent), 200 mls.  
$\frac{CN}{Cu}$ ratio $= \frac{8}{1}$ Reaction proceeded similarly to the foregoing experiment at the lower CN/CU ratio and the product was extracted in the same manner to yield 4.06 gms. of a black granular material of 8.5% copper content.

Thermal stability.—The thermal stability of the copper complex containing 8.5% copper from the reaction at a CN/Cu ratio of 8/1 was examined using a quartz spring balance; specimens of the chelating polymer and the parent polyacrylonitrile were heated in vacuo at 360° C. for a period of 3 hours.

Complex containing 8.5% copper, weight loss, 22.1% Polyacrylonitrile, weight loss, 85.8%.

From the weight loss at 360° C. the copper-polyacrylonitrile complex is seen to be appreciably more stable thermally than the parent polymer.

EXAMPLE II

Preparation of reinforced molded articles

Two solutions were added to a Z blade mixer containing 50 grams of asbestos fibers (Canadian 4R grade). The first solution was 11.75 gms. of copper acetate in 62.5 cc. of DMF and the second was 12.50 gms. of polyacrylonitrile (14,000 M.W.) in 62.5 cc. of DMF. Both solutions were heated prior to their addition to the mixer to maintain the solutions and to facilitate the mixing of the asbestos fibers. After the solutions and the fibers were thoroughly mixed, the resultant slurry was discharged from the mixer and dried at 80° C. under a pressure of 1 cm. of Hg until the solvent was virtually all removed.

The dried fibrous cake was broken up, recharged to the Z blade mixer and impregnated with the same quantities of copper salt and polymer solutions previously employed. The slurry of impregnated fibers was again vacuum dried at 80° C. and 1 cm. Hg. The dried impregnated fibrous cake was disintegrated and then molded at 195° C. for 30 minutes under 1000 pounds per square inch pressure. The molded specimens ejected hot from the mold were tough, rigid and of good surface appearance.

EXAMPLE III

Preparation of reinforced molded articles 3.27 gms. of copper acetylactonate, 2.65 gms. of polyacrylonitrile (14,000 M.W.) and 5.92 gms. of asbestos fiber (Canadian 4 R grade) were mixed in a flask with 185 cc. of DMF. After mixing, the flask was heated to the reflux temperature over 40 minutes, until all the copper salt and polymer dissolved in the solvent. After an additional 5 minutes of heating, the content of the flask csanged to a gel which was discharged to a tray, spread out and dried at 80° C. in a vacuum oven at a pressure of 1 cm. Hg.

The dried impregnated fibrous cake was broken up and molded at 195° C. for 30 minutes under 1000 pounds per square inch pressure. The moldings ejected hot from the mold were tough, rigid and of good surface appearance.

EXAMPLE IV 140.6 gms. of copper borate and 106.2 gms. of polyacrylonitrile (135,000 M.W.) were ball milled to a fine powder passing a 200-mesh sieve before tumble mixing with 61.7 gms. of asbestos fiber (Canadian 4 R grade).

The fiber, polymer and copper salt were ball-milled for 6 hours in a porcelain mill and then dry mixed powder molded at 195° C. for 30 minutes under 1000 pounds per square inch pressure.

The moldings, ejected from the mold, were tough, rigid and of good uniform surface appearance. During the molding operation no marked evolution of fumes was observed, nor did repeated production of moldings from the same mold lead to mold corrosition.

The tensile strength of molded specimens was 5,400 pounds per square inch at room temperature.

EXAMPLE V 5.49 gms. of zinc acetate and 5.34 gms. of polyacrylonitrile (135,000 M.W.) were stirred in a flask with 400 cc. of DMF. The flask was heated to 135° C. until all the zinc salt and the polyacrylonitrile dissolved in the solvent. After additional heating, the content of the flask changed to a gel which was discharged to a tray, spread out and dried at 80° C. under vacuum. Total reaction time was about 1 hour.

The dried granular product was broken up and molded at 195° C. for 30 minutes under a pressure of 1000 pounds per square inch. The moldings, ejected hot from the mold, were tough, rigid and of good surface appearance.

Similar results to those described in the foregoing examples are obtained by the use of various other organic cupric and zinc salts, such as the benzoates and oxalates as well as zinc borate and other inorganic cupric and zinc salts such as the chlorides, nitrates, phosphates, carbonates, silicates and sulphates. The thermal stability of the fully thermoset products obtained was satisfactory in most cases as determined by noting the loss in weight on heating in air at 250° C. In the case of the product made with the cupric oxalate however, it was found that if the molding was carried out at a temperature of about 200° C. or more then the cured product occasionally inflamed spontaneously when the mold was opened; this may be due to a partial decomposition of the oxalate to cupric oxide since the phenomenon of inflaming was noted when cupric oxide was tested but this conclusion is theoretical only and has not been experimentally established.

The preferred copper salt is cupric borate since the products obtained with it had the greatest thermal stability of any so far produced. Another reason for preferring the cupric borate is that there appears to be no corrosive action on the mild steel molds employed whereas with many of the salts of stronger acids, including the organic acid salts tested, we have noted the generaton of corrosive vapors during the molding operation at about 190° C. to 195° C. which will clearly lead to considerable damage to the mold surface at least on extended use. Corrosion of the mold could, however, be avoided when employing other salts by the use of corrosion resistant materials for the mold surfaces.

While the temperature range of about 190°–195° C. has been indicated as being a particularly preferred range for the molding operation, lower or higher temperatures may, of course, be employed, with consequent lengthening or reduction in the molding operation; for example, a molding temperature of about 160° C. would require the molding composition to be held in the mold for about 4 hours in order to produce a thermoset product, while in contrast, the equivalent molding time at 195° C. is about 30 minutes.

EXAMPLE VI

Copper polyacrylonitrile as a coating medium

A solution of low molecular weight polyacryonitrile and cupric acetate in DMF was prepared with a molar ratio of $$\frac{CN}{Cu} = \frac{8}{1}$$

This molar ratio was chosen in order to produce a more flexible coating than would have resulted had a lower ratio been employed. The solution, approximately 15% solids, was prepared and stored at room temperature and was found to be stable for several days in the absence of air. This solution was used to coat a copper tube.

Before coating, the copper tube was thoroughly cleaned and acid etched followed by solvent washing. The tube was dip coated in the solution and hung vertically for 15 minutes to drain, after which it was placed in an oven at 195° C. for 30 minutes. During this heating period, the coating, previously very pale green, took on a shiny jet black appearance of the finished article. Samples were then immersed for 16 hours in 10% $HNO_3$, industrial methylated spirits, trichloroethylene, methylene chloride, benzene, 10% NaOH, and dimethyl formamide. It was found the coating had excellent resistance against these solvents. The adhesion of the coating was also excellent.

EXAMPLE VII

Copper polyacrylonitrile as bonding agent in the manufacture of abrasive wheels

Abrasive alumina 16-mesh grit was wetted with dimethylformamide solution of cupric acetate and polyacrylonitrile (CN/Cu molar ratio=4). The wetting solution was approximately 14.4% solids; 16.8% of the grit weight of solution was used.

In order to bring the bonding agent concentration of the final wheel up to 23.05% of the grit weight in the wheel, (18.7% total weight of the wheel), a dry powder mixture of polyacrylonitrile and cupric borate was added to the grit dampened with polyacrylonitrile-copper acetate solution. After thoroughly blending, a final composition was molded at 150° C. in a fully positive mold under a pressure of 3.98 tons per square inch for 30 minutes. A post cure of 4 hours at 180° C. in an oven completed the preparation.

EXAMPLE VIII

The following plastimet was prepared using the following composition:

Polyacrylonitrile (M.W. 94,000), 75 parts by wt.
Cupric borate, 49.5 parts by wt.   $\frac{CN}{Cu} = 4:1$ Copper powder (organic synthesis grade, particles approx. 60μ), 125 parts by wt.

The composition was mixed by dry-blending and molded at 180°–190° C. for 30 minutes under a pressure of 3.2 tons per square inch.

Plastimet properties:
    Impact strength (notched Izod to A.S.T.M. D256–56 Method A) _____ 0.67 ft. lbs. per inch.
    Flexural strength _____ 7530 lbs. per sq. inch.
    Flexural modulus _____ 9.8×10⁵ per sq. inch.
    Electrical conductivity _____ 6300 mho./cm.

EXAMPLE IX

A metal-to-metal adhesive was prepared by mixing polyacrylonitrile (8000 M.W.) and cupric acetate in dimethylformamide with a molar ratio of CN/Cu=8. The resultant adhesive was used to laminate two copper sheets by pressing the adhesive coated sheets in a press for 30 mintues at 190 C. under a pressure of 6 tons per square inch. The laminate was baked in an oven at 195° C. for 30 minutes. The resultant laminate showed good bonding strength.

The above examples show some of the applications of the organometallic polymers of this invention. It is understood the utility of these polymers is not limited thereto. For example, it can be used to prepare copper or zinc polyacrylonitrile fibers suitable as reinforcing agents in plastics intended for high temperature use. Other applications of these polymers will be apparent to one skilled in the art based on the disclosures presented hereinabove.

We claim:
1. A composition comprising a polyacrylonitrile and a metal salt capable of complexing with the polyacrylonitrile to form a thermoset material, said metal salt being a copper or a zinc salt and the amount of the metal salt in the composition being equivalent to 1 mole of copper or zinc to about 1 to 8 moles of nitrile groups of the polyacrylonitrile.
2. A composition according to claim 1 wherein the composition contains a filler.
3. A composition according to claim 1 wherein the metal salt is a copper salt.
4. A composition according to claim 2 wherein the composition is in the form of solid granules.
5. A composition according to claim 2 wherein the filler is copper powder or alumina.
6. A composition according to claim 2 wherein the filler is a fibrous material capable of withstanding a temperature of about 250° C.
7. A composition according to claim 1 wherein the metal salt and the polymer are dissolved in a common solvent.
8. A process for preparing a thermoset article which comprises heating at an elevated temperature sufficiently high to cause the thermosetting but below about 250° C. a composition comprising a polyacrylonitrile and a metal salt capable of complexing with said polymer, said metal salt is a copper or a zinc salt and the amount in the composition being equivalent to 1 mole of copper or zinc to about 1 to 8 moles of nitrile groups of the polymer, whereby forming a thermoset material.
9. A process according to claim 8 wherein the metal salt is cupric borate, cupric acetate, cupric acetylacetonate, cupric oxalate, cupric benzoate, cupric carbonate, cupric phosphate, cupric silicate, cupric sulfate, cupric chloride, cupric nitrate, zinc acetate, zinc borate, zinc acetylacetonate, zinc oxalate, zinc benzoate, zinc carbonate, zinc phosphate, zinc silicate, zinc sulfate, zinc chloride or zinc nitrate.
10. A process according to claim 8 wherein the composition contains a filler and the reaction is carried out in a mold at super atmospheric pressure.
11. A process according to claim 10 wherein the filler is a fibrous material capable of withstanding the thermosetting temperature.
12. A process according to claim 10 wherein the filler is copper powder.
13. A process according to claim 8 wherein the composition is in a common solvent for the salt and the powder.
14. A process according to claim 13 wherein the composition is in a common solvent for the salt and the powder and having dispersed therein a filler and the reaction is carried out by initially removing the solvent and followed by molding the resultant mass at an elevated temperature below about 250° C.
15. A thermoset material comprising copper or zinc chemically bonded to a polyacrylonitrile, made by the process of claim 8.
16. A thermoset material of claim 15 wherein the metal is copper.
17. A process for providing a layer of protective material on a metal surface which comprises preparing a polymer solution comprising a polyacrylonitrile and a metal salt capable of complexing with the polyacrylonitrile at an elevated temperature in a common solvent for the polyacrylonitrile and the salt, the metal salt being a copper or a zinc salt and in an amount equivalent to 1 mole of metal to about 1 to 8 moles of nitrile groups of the polyacrylonitrile, coating said solution on the metal surface, vaporizing the solvent in the solution and heating this coating at an elevated temperature sufficiently high to cause thermosetting but below about 250° C., thereby curing the same to form a thermoset layer thereon.
18. A process according to claim 17 wherein the metal salt is a copper salt.
19. A coating composition suitable for providing a protective coating on a cuprous surface which comprises a solution of a polyacrylonitrile, and a copper salt capable of complexing with the polyacrylonitrile at an elevated temperature below about 250° C. in a common solvent for said polyacrylonitrile and salt, the copper salt in said solvent being equivalent to 1 mole of metal to about 1 to 8 moles of nitrile groups of the polyacrylonitrile.
20. A coating composition according to claim 19 wherein the solvent is dimethylformamide.
21. A plastimet comprising a thermoset material of fine copper powder embedded in a copper polyacrylonitrile chelating polymeric matrix.
22. A molded article comprising a thermoset material of fillers embedded in a copper or zinc polyacrylonitrile chelating polymeric matrix.

References Cited

UNITED STATES PATENTS

| | | | |
|---|---|---|---|
| 2,356,767 | 8/1944 | Kropa | 260—88.7 |
| 2,648,648 | 8/1953 | Stanton et al. | 260—88.7 |
| 3,399,176 | 8/1968 | Boenig et al. | 260—83.3 |
| 2,140,921 | 12/1938 | Rein | 260—8 |
| 2,847,389 | 8/1958 | Evans | 260—41.13 |
| 2,865,880 | 12/1958 | Caldwell | 260—32.6 |
| 2,727,021 | 12/1955 | Price. | |
| 2,878,202 | 3/1959 | Jenkins | 260—32.6 |
| 2,404,714 | 7/1946 | Latham | 260—32.6 |
| 2,451,420 | 10/1948 | Watkins | 260—32.6 |
| 2,559,172 | 7/1951 | Schneider | 260—32.6 |
| 3,325,405 | 6/1967 | Kamath | 260—32.6 |

FOREIGN PATENTS 852,936 11/1960 Great Britain.

OTHER REFERENCES

Metal Filled Plastics, by Delmonte, 1961, pp. 11, 96 and 97.

ALLAN LIEBERMAN, Primary Examiner

H. FLETCHER, Assistant Examiner

U.S. Cl. X.R.

260—41, 88.7, 429.9, 438.1